United States Patent
Salter et al.

(10) Patent No.: US 12,459,317 B2
(45) Date of Patent: Nov. 4, 2025

(54) VEHICLE HITCH INTEGRATED ELECTRICAL CONNECTOR

(71) Applicant: Ford Global Technologies, LLC, Dearborn, MI (US)

(72) Inventors: Stuart Salter, White Lake, MI (US); Gabriella Jacobsen, Ferndale, MI (US); Arnav Wagh, Detroit, MI (US); Daniel Heaton, Dearborn, MI (US); Brendan Diamond, Grosse Pointe, MI (US); Robert Vitali, Sterling Heights, MI (US); David Diamond, Canton, MI (US); Kevin King, Detroit, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 750 days.

(21) Appl. No.: 17/831,132

(22) Filed: Jun. 2, 2022

(65) Prior Publication Data
US 2023/0391152 A1  Dec. 7, 2023

(51) Int. Cl.
*B60D 1/64* (2006.01)
*H01R 13/15* (2006.01)
*H01R 13/642* (2006.01)
*B60D 1/145* (2006.01)

(52) U.S. Cl.
CPC ............. *B60D 1/64* (2013.01); *H01R 13/15* (2013.01); *H01R 13/642* (2013.01); *B60D 1/145* (2013.01)

(58) Field of Classification Search
CPC ................................. B60D 1/64; H01R 13/08
See application file for complete search history.

(56) References Cited

U.S. PATENT DOCUMENTS

| | | | |
|---|---|---|---|
| 4,283,072 A | 8/1981 | Deloach, Jr. | |
| 5,580,076 A * | 12/1996 | DeRoule | B60D 1/62 280/491.5 |
| 6,951,346 B2 * | 10/2005 | Brackett | B60D 1/075 280/491.2 |
| 7,731,515 B2 * | 6/2010 | Nicholson | H01R 13/523 439/201 |
| 7,850,191 B1 * | 12/2010 | Kaminski | B60D 1/64 439/35 |
| 8,475,176 B2 | 7/2013 | Holmes et al. | |
| 10,252,588 B2 | 4/2019 | Scott | |
| 10,919,353 B2 | 2/2021 | Shaeffer et al. | |

FOREIGN PATENT DOCUMENTS

AU     2016201229 A1    3/2016

* cited by examiner

Primary Examiner — Kevin Hurley
(74) *Attorney, Agent, or Firm* — Frank Lollo; Brooks Kushman P.C.

(57) ABSTRACT

A hitch receiver for an automotive vehicle includes a receiver tube defining an open end and a cavity therein. The hitch receiver also includes an electrical connector, having a plurality of electrical contacts on a spring-loaded face thereof, disposed within the receiver tube at an end thereof opposite the open end such that the electrical contacts are adjacent to the cavity.

19 Claims, 3 Drawing Sheets

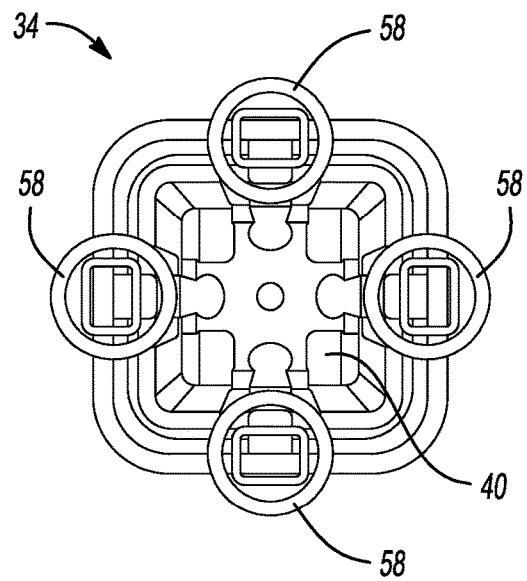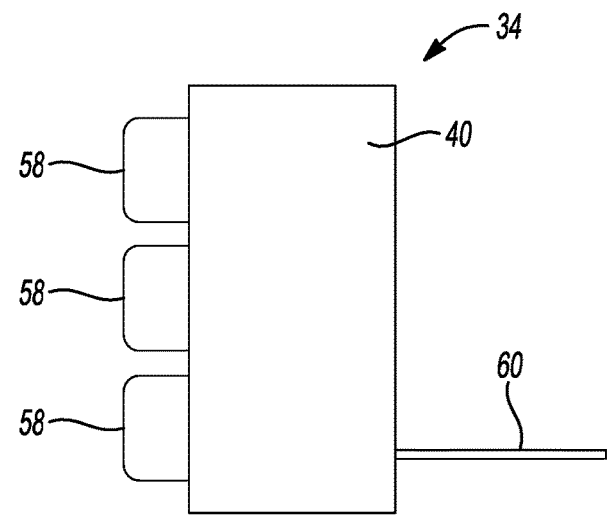
*Fig-2A*  *Fig-2B*
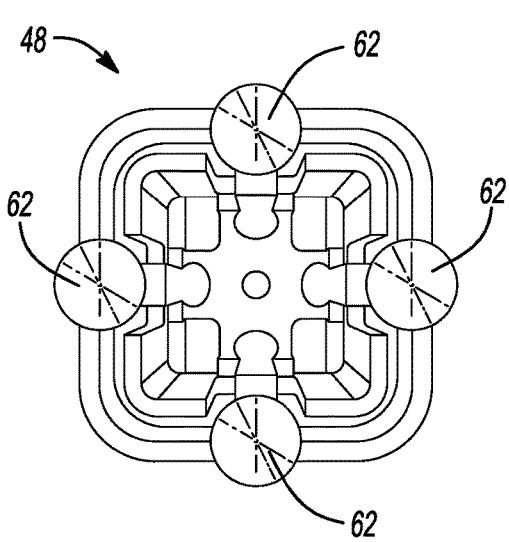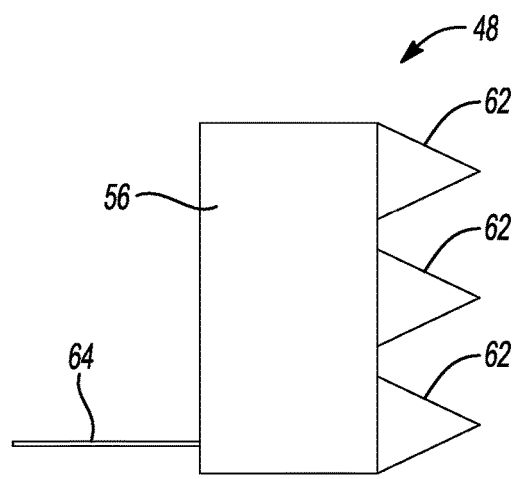
*Fig-3A*  *Fig-3B*

VEHICLE HITCH INTEGRATED ELECTRICAL CONNECTOR

TECHNICAL FIELD

This disclosure relates to automotive trailer hitch systems.

BACKGROUND

Trailers (e.g., enclosed trailers, etc.) including electrically powered components (e.g., lights, etc.) may be electrically connected with corresponding vehicles arranged to tow them. Accessories (e.g., grilles, etc.) including electrically powered components (e.g., heating elements, etc.) may also be electrically connected with corresponding vehicles configured to power them.

SUMMARY

A hitch system for a vehicle includes a tubular hitch receiver having an electrical connector disposed therein, and defining an open end opposite the electrical connector and a cavity between the open end and electrical connector. The electrical connector has a plurality of electrical contacts on a spring-loaded face thereof adjacent to the cavity. The hitch system also includes a hitch mount having an end defining a plurality of electrical pins corresponding to the electrical contacts and configured to be inserted into the cavity via the open end and contact the spring-loaded face such that the electrical contacts and electrical pins are electrically connected. The spring-loaded face may move responsive to contact with the end. The spring-loaded face may define a concave surface and the end may define a convex surface that cooperates with the concave surface to align the electrical contacts and electrical pins. The electrical pins may be coned in shape. The electrical contacts may be recessed relative to the spring-loaded face. The electrical contacts may be cylindrical or funneled in shape. The electrical contacts and electrical pins may each be arranged in a cross pattern. The tubular hitch receiver may be rectangular in shape. The hitch system may include a lock arrangement on the tubular hitch receiver that secures the hitch mount relative to the receiver tube. The lock arrangement may include at least one retaining pin that engages the tubular hitch mount.

A hitch receiver for an automotive vehicle includes a receiver tube defining an open end and a cavity therein, and that can be mounted to the automotive vehicle. The hitch receiver also includes an electrical connector, having a plurality of electrical contacts on a spring-loaded face thereof, disposed within the receiver tube at an end thereof opposite the open end such that the electrical contacts are adjacent to the cavity. The spring-loaded face may move responsive to contact. The spring-loaded face may define a concave surface. The electrical contacts may be recessed relative to the spring-loaded face. The electrical contacts may be cylindrical or funneled in shape. The electrical contacts may be arranged in a cross pattern. The receiver tube may be rectangular in shape. The hitch receiver may include a lock arrangement on the receiver tube.

A hitch system includes a hitch mount having an end defining a plurality of cone-shaped electrical pins corresponding to the electrical contacts. The hitch mount is arranged to be inserted into an open end of a hitch receiver tube and contact electrical contacts therein. The cone-shaped electrical pins may be arranged in a cross pattern.

BRIEF DESCRIPTION OF THE DRAWINGS

FIGS. 2A and 2B are front and side views of a portion of a spring-loaded electrical connector of the hitch system of FIG. 1.

FIGS. 3A and 3B are front and side view of a portion of a contactor end of the hitch system of FIG. 1.

DETAILED DESCRIPTION

Figure 1:
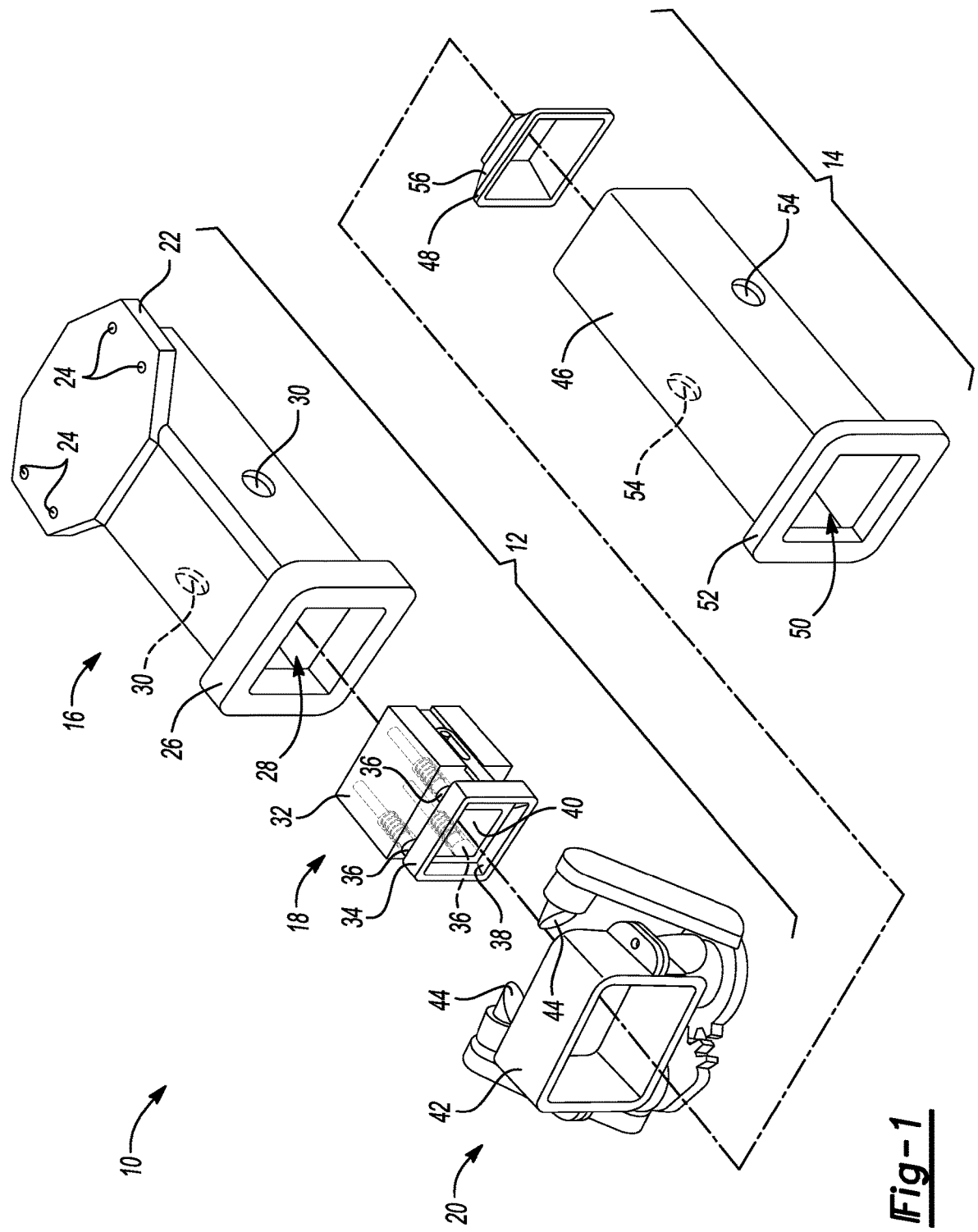
FIG. 1 is an exploded perspective view of a hitch system for a vehicle.

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Existing vehicle hitches have a receiver tube for which a ball mount slides therein. These ball mounts can be categorized into 5 "Classes" based on their towing/tongue weight capabilities. Class 1/2 ball mounts utilize a 1.25" wide square receiver tube and Class 3/4/5 are made of 2.00" square tube.

Here, focus is on redesigning the trailer hitch, receiver tube, and hitch pin mechanism to allow for a vehicle hitch integrated electrical connector that does not affect the capabilities of the vehicle to use standard ball mounts for existing trailer connections. The receiving end on the hitch, where the electrical connection is made, may be located far into the receiver tube to allow for normal towing-based ball mounts to be installed without contacting the electrical connector. The ball mount may automatically lock into the receiver to ensure that high value accessories cannot be removed. The vehicle can unlock the hitch via the touch screen. The vehicle energy storage capability, current operational state/remaining range, and distance to a return location/charger can be used to limit the power output of the receiver to conserve energy when needed. The vehicle may prevent movement, or shifting from park to drive, if the accessory system is still attached and the user forgets to disconnect it for specific types of accessory systems. It may enable the vehicle to communicate with the device to determine where, when, and how long to charge based on the external system charge capability/needs. If power consumption is high enough, and the vehicle is a non-battery electric vehicle, connecting the ball mount may cause a direct engine start to help manage the electrical load. With hybrid vehicles, the engine start/runtime behavior can be optimized based on the high voltage battery state of charge/high voltage battery useable battery energy, and energy demand of the system to manage stored energy resources.

The vehicle sensor suite can be leveraged to turn on/off the accessory system automatically if the vehicle determines the system is not in use or no one is around the vehicle for different durations of time for specific systems, such as a stove top or other accessory system. An electronically actuated solenoid based locking mechanism, which could replace the self-locking mechanism, may be controlled by the vehicle/key fob/phone-as-a-key/audible user input to ensure the inserted device is not removed when the users are not around the vehicle. The system may also have a latch/auto-eject spring loaded feature built in to help ensure the accessory is removed/inserted/aligned easily.

The vehicle controlled electrical connector may be built into the vehicle hitch and receiver tube as part of the design to enable charging of external electrified systems or a regulated energy supply while the vehicle is parked or driving. The receiving end on the hitch, where the electrical connection is made, may be positioned far into the receiver tube to allow for normal towing-based ball mounts to be installed without affecting the electrical connector. Automatic enablement of the power receiving feature, as well as the connectivity related features like CAN/Bluetooth, can be realized when an electrical coupling is created by inserting the electrified feature ball mount into the receiver. When coupled, data can be transferred using a vehicle-based CAN communication protocol or other communication protocol. This communication can be used to control energy usage, communicate status signals of both the vehicle battery system and the external electrified system/battery system/energy needs. The connected accessory may be controlled using the vehicle screen or via Bluetooth.

For vehicle implementation applications using 110V AC power and less than 4 kW of power usage, the following example design specifications can be used: 12 gauge power/ground wires to allow for 20 A continuous pull; 18 gauge wires for CAN communication (wireless communication can also be enabled via Bluetooth, etc.); 4 pin connector—2 power wires/2 CAN wires; the female end of the electrical contact may be contained within an end of the receiver tube and the male electrical contact may be carried by the ball mount.

The type of accessory used along with the usage profile may be communicated to the vehicle. The usage profile can contain information such as expected energy usage, turn-off time if not in use, etc. The connector may be of a barrel-in-a-barrel type to ensure proper alignment when the connections are made. This design may have the barrel taper as the connector is inserted axially and allow the barrel/pins to engage half-way through. This may also enable a better seal, which will minimize water intrusion/corrosion.

The connector design may employ similar features to a German-based connector to ensure a high level of fluid/immersion resistance, ensure temperature robustness between, for example, −55° C. to +125° C., minimize corrosion, and improve robustness associated with constant connecting and disconnecting. Integrated features may include a wedge lock on both the receptacle and plug side of the connector to ensure proper contact alignment and retention and/or a silicon rubber grommet on the plug connector and interfacial seals on the receptable connector. Other sealing systems, however, may also be used.

An electronically actuated solenoid based locking mechanism, which could replace the self-locking mechanism, may be controlled by the vehicle/key fob/phone-as-a-key/audible user input to ensure the inserted device is not removed when the users are not around the vehicle. Mechanical locking systems can also be used as needed. The system may also have a latch/auto-eject spring loaded feature built-in to help ensure the accessory is removed/inserted easily. The vehicle-based cameras can use facial recognition to determine who the lock mechanism should be unlocked/locked for. If not locked by the user manually, the vehicle may lock the hitch automatically based on certain vehicle operational conditions such as a non-zero vehicle speed or when the system is in use, or based on vehicle location, etc.

At least two different types of hitch-based options may be realized. One is internal to the hitch and may be offered from the factory. Another could be a type of lever connector, external to the hitch, and part of an aftermarket kit such that the item can be offered from the factory or installed later by the dealer. The vehicle energy storage capability, current operational state/remaining range, and distance to a return location/charger may be used to limit the power output of the receiver as to conserve energy when needed. The user may also receive notifications and take actions to reduce energy consumption of the device if desired.

When the hitch receiver is not in use, a dummy plug may be inserted to help ensure the area is minimally exposed to water. Additionally, in a different embodiment, the act of inserting the ball mount like device may open a connector cover automatically to keep the connection area clean and protected when not in use. Provisions for this system, such as extra clearance for a cover being opened such that it stores flush into the receiver, may be designed into the receiver to allow for seamless integration.

Affected sensors such as the backup camera/radar can be turned off if their usage is affected by the electrically connected device (e.g., in the sensor pathway). If the vehicle sensors have a clear viewpoint of the accessories, they may be used to monitor the electrically connected accessory systems. Security features from sentinel components may be used to leverage the vehicle radar/vision system to determine if unauthorized users are coming within proximity of the vehicle or accessory, to alert the user/authorities, and to record videos as needed. For charging electric bikes, this system may not disable vehicle movement, but for electric stove tops still on/connected to the vehicle, the system may be disabled.

Referring to FIG. 1, a hitch system 10 for a vehicle (e.g., an automotive vehicle such as a truck) includes a hitch receiver 12 and a hitch mount 14. The hitch receiver 12 includes a receiver tube 16, a spring-loaded electrical connector 18, and a self-locking arrangement 20. The receiver tube 16, in this example, is rectangular in shape and has an end including a mounting plate 22 that defines a plurality of through holes 24 that can accommodate fasteners used to mount the hitch receiver 12 to the vehicle in usual fashion. Other tube shapes are also contemplated as will be apparent below. Moreover, any suitable mounting strategy may be used. The receiver tube 16 further defines a rim 26 at an open end 28 opposite the mounting plate 22 and through holes 30 on opposite sides thereof. The receiver tube 16 thus defines a cavity in a vicinity of the through holes 30 between the end including the mounting plate 22 and the open end 28. As explained in further detail below, portions of the hitch mount 14 may occupy this cavity when attached to the hitch receiver 12.

The spring-loaded electrical connector 18 includes a body 32 configured to engage an interior of the receiver tube 16 in a vicinity of the end including the mounting plate 22. The spring-loaded electrical connector 18 also includes a face 34 mounted to a plurality of spring-loaded legs 36 that extend into the body 32 and permit the face 34 to move relative to the body 32 responsive to contact with the face 34. The face 34 defines a concave portion 38 and a flat portion 40. As explained in further detail below, the face 34 engages the hitch mount 14 to facilitate an electrical connection between the hitch receiver 12 and the hitch mount 14. Electrical connectors, in other examples, need not be spring-loaded or include such guiding features.

In this example, the self-locking arrangement 20 includes a collar 42 configured to encircle an exterior of the receiver tube 16 in a vicinity of the rim 26, and retaining pins 44 that are connected with the collar 42 and extend through and into the receiver tube 16 via the through holes 30. Other examples may include simple push pins or other suitable components to secure parts relative to one another. Such locking arrangements may also be omitted depending on design considerations and intended use circumstances.

The hitch mount 14 includes a mount tube 46, a contactor end 48, an open end 50 with a rim 52 therearound, and through holes 54. The mount tube 46, in this example, is rectangular and configured to be inserted into the receiver tube 16 via the open end 28 such that the contactor end 48 contacts the face 34 and the retaining pins 44 engage the through holes 54 to secure the hitch mount 14 relative to the hitch receiver 12. The contactor end 48 defines a convex portion 56 configured to cooperate with the concave portion 38 to align the contactor end 48 with the face 34. This may be helpful in arrangements in which the user cannot see the face 34 or the contactor end 48 during assembly.

Referring to FIGS. 2A and 2B, the face 34 includes a plurality of electrical contacts 58. In this example, the electrical contacts 58 are cylindrical or funneled in shape and are electrically connected with an electrical line 60 that permits the electrical contacts 58 to be electrically connected with an electrical system of the vehicle in usual fashion. Other shapes (flat, square, etc.), however, are also contemplated. Also, the electrical contacts 58 may be recessed into the flat portion 40, etc. There are four electrical contacts 58 arranged in a cross pattern in this example. Any number arranged in any suitable pattern, however, may be used.

Referring to FIGS. 3A and 3B, the contactor end 48 includes a plurality of electrical pins 62. In this example, the electrical pins 62 are coned in shape and project away from a surface of the contactor end 48. Other shapes, however, are also contemplated. The electrical pins 62 are also electrically connected with an electrical line 64 the permits the electrical pins 62 to be electrically connected with an electrical system of a trailer or other accessory in usual fashion. There are four electrical pins 62 arranged in a cross pattern to correspond to the pattern of the electrical contacts 58. As mentioned above however, any number arranged in any suitable pattern may be used. A single electrical pin, for example, could be used, etc.

Given the electrical contacts 58 are funnel shaped and the electrical pins 62 are cone shaped, they cooperate to align their connection as the tips of the electrical pins 62 have wide clearance to enter the electrical contacts 58 prior to full engagement therebetween. Moreover, given the face 34 has the concave portion 38 and the contactor end 48 has the convex portion 56, they cooperate to align their connection as the tip of the contactor end 48 has a wide clearance to enter the hitch receiver 12 via the open end 28 and the face 34 prior to full engagement therebetween. Again, these features may facilitate easy connection, particularly in circumstances in which the user cannot see the face 34 or the contactor end 48.

Figure 4:
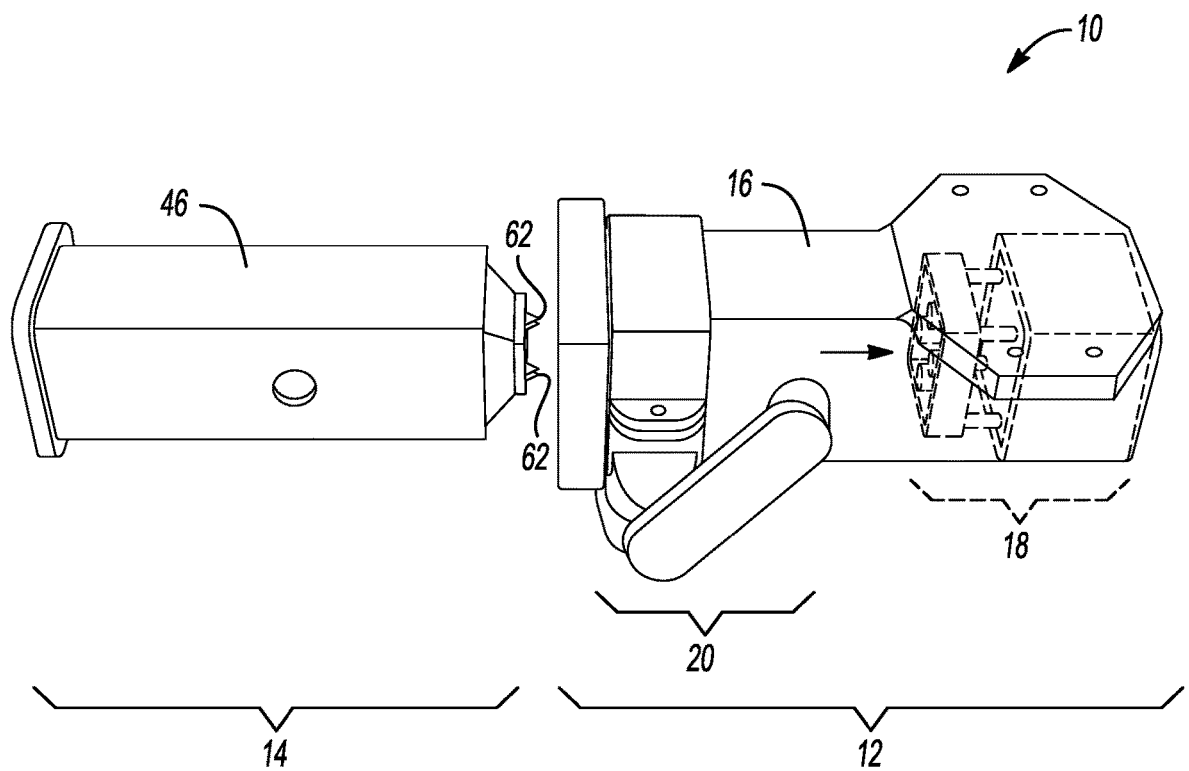
FIG. 4 is an assembly view of the hitch system of FIG. 1.

Referring to FIG. 4, the electrical connector 18 and self-locking arrangement 20 are shown assembled with the receiver tube 16. Likewise, the contactor end 48 is shown assembled with the mount tube 46.

Figure 5:
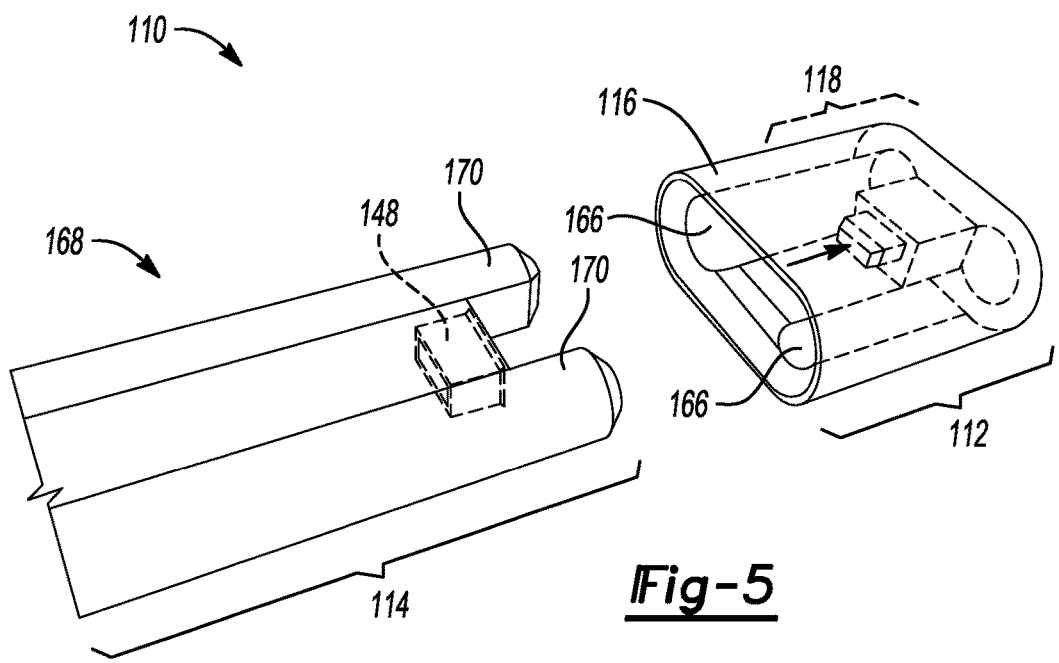
FIG. 5 is an assembly view of another hitch system for a vehicle.

Referring to FIG. 5, a hitch system 110 for a vehicle includes a hitch receiver 112 and a hitch mount 114. The hitch receiver 112 includes a receiver tube 116 and a spring-loaded electrical connector 118. The receiver tube 116, in this example, is elliptically cylindrical in shape. The receiver tube 116 further defines concave surfaces 166 that cooperate with portions of the hitch mount 14 as described in further detail below. The spring-loaded electrical connector 118 is configured similar to the spring-loaded electrical connector 18 with certain design changes to accommodate the different shape of the receiver tube 116. The spring-loaded electrical connector 188, like the spring-loaded electrical connector 18, includes electrical contacts and engages the hitch mount 114 to facilitate an electrical connection between the hitch receiver 112 and hitch mount 114.

The hitch mount 114 includes a body 168 defining a contactor end 148 and a pair of tube portions 170. The contactor end 148, like the contactor end 48, includes electrical pins configured to engage the electrical contacts of the spring-loaded electrical connector 118.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. Electrical contacts, for example, may be cone shaped and electrical terminals may be funnel shaped. Other arrangements are also possible. The words used in the specification are words of description rather than limitation, and it is understood that various changes may be made without departing from the spirit and scope of the disclosure.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A hitch system for a vehicle comprising:
   a tubular hitch receiver including an electrical connector disposed therein and defining an open end opposite the electrical connector and a cavity between the open end and electrical connector, wherein the electrical connector has a plurality of electrical contacts on a spring-loaded face thereof adjacent to the cavity; and
   a tubular hitch mount including an end (i) having a plurality of electrical pins corresponding to the electrical contacts and (ii) configured to be inserted into the cavity via the open end and contact the spring-loaded face such that the electrical contacts and electrical pins are electrically connected.

2. The hitch system of claim 1, wherein the spring-loaded face is configured to move responsive to contact with the end.

3. The hitch system of claim 1, wherein the spring-loaded face defines a concave surface and the end defines a convex surface configured to cooperate with the concave surface to align the electrical contacts and electrical pins.

4. The hitch system of claim 1, wherein the electrical pins are coned in shape.

5. The hitch system of claim 1, wherein the electrical contacts are recessed relative to the spring-loaded face.

6. The hitch system of claim 1, wherein the electrical contacts are cylindrical or funneled in shape.

7. The hitch system of claim 1, wherein the electrical contacts and electrical pins each are arranged in a cross pattern.

8. The hitch system of claim 1, wherein the tubular hitch receiver is rectangular in shape.

9. The hitch system of claim 1 further comprising a lock arrangement on the tubular hitch receiver configured to secure the tubular hitch mount relative to the tubular hitch receiver.

10. The hitch system of claim 9, wherein the lock arrangement includes at least one retaining pin configured to engage the tubular hitch mount.

11. A hitch receiver for an automotive vehicle comprising:
    a receiver tube defining an open end and a cavity therein, and configured to be mounted to the automotive vehicle; and
    an electrical connector, having a plurality of electrical contacts on a spring-loaded face thereof, disposed within the receiver tube at an end thereof opposite the open end such that the electrical contacts are adjacent to the cavity.

12. The hitch receiver of claim 11, wherein the spring-loaded face is configured to move responsive to contact.

13. The hitch receiver of claim 11, wherein the spring-loaded face defines a concave surface.

14. The hitch receiver of claim 11, wherein the electrical contacts are recessed relative to the spring-loaded face.

15. The hitch receiver of claim 11, wherein the electrical contacts are cylindrical or funneled in shape.

16. The hitch receiver of claim 11, wherein the electrical contacts are arranged in a cross pattern.

17. The hitch receiver of claim 11, wherein the receiver tube is rectangular in shape.

18. The hitch receiver of claim 11 further comprising a lock arrangement on the receiver tube.

19. A hitch system comprising:
    a hitch mount, including an end defining a plurality of cone-shaped electrical pins arranged in a cross pattern, configured to be inserted into an open end of a hitch receiver tube and contact electrical contacts therein.

* * * * *